United States Patent
Perkins et al.

(10) Patent No.: US 11,643,959 B2
(45) Date of Patent: May 9, 2023

(54) ADDITIVELY MANUFACTURED CATALYTIC CONVERTER SUBSTRATES

(71) Applicant: FORD GLOBAL TECHNOLOGIES, LLC, Dearborn, MI (US)

(72) Inventors: Alexander Perkins, Detroit, MI (US); Robert D. Bedard, Allen Park, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/167,807

(22) Filed: Feb. 4, 2021

(65) Prior Publication Data
US 2022/0243634 A1 Aug. 4, 2022

(51) Int. Cl.
F01N 3/28 (2006.01)
B33Y 10/00 (2015.01)
B33Y 80/00 (2015.01)

(52) U.S. Cl.
CPC ............ F01N 3/2803 (2013.01); *B33Y 10/00* (2014.12); *B33Y 80/00* (2014.12); *F01N 2370/02* (2013.01)

(58) Field of Classification Search
CPC ... F01N 3/2803; F01N 2370/02; B33Y 10/00; B33Y 80/00
USPC ....................................................... 422/177
See application file for complete search history.

(56) References Cited

U.S. PATENT DOCUMENTS

| | | | | |
|---|---|---|---|---|
| 3,785,781 A | * | 1/1974 | Hervert | F01N 3/2853 60/299 |
| 4,118,199 A | * | 10/1978 | Volker | B01J 35/0006 422/171 |
| 5,155,995 A | | 10/1992 | Kinnear et al. | |
| 5,328,774 A | * | 7/1994 | Maus | F01N 3/281 428/116 |
| 5,397,545 A | * | 3/1995 | Balling | F01N 3/2889 422/171 |

(Continued)

FOREIGN PATENT DOCUMENTS

| | | |
|---|---|---|
| CN | 204082279 U | 1/2015 |
| EP | 0178426 A1 | 4/1986 |
| WO | 2015/028738 A1 | 3/2015 |

OTHER PUBLICATIONS

Santoliquido, O. et al., "Additive manufacturing of periodic ceramic substrates for automotive catalyst supports," Int J. Appl Ceram Technol. 2017; 14, pp. 1164-1173.

*Primary Examiner* — Tom P Duong
(74) *Attorney, Agent, or Firm* — Vincent Mastrogiacomo; Brooks Kushman P.C.

(57) ABSTRACT

A catalytic converter includes a catalyst substrate including a body having a length and defining a plurality of zones along the length, with each zone having at least one cross-sectional structure defining a plurality of cells forming an exhaust gas flow path through the length via cells of adjacent zones, and the cells being more densely arranged within the at least one cross-sectional structure of an upstream zone than an adjacent downstream zone. The catalytic converter also includes a wash-coat layer deposited on surfaces of the cells forming active surface area configured to react with exhaust gas traveling along the length. The exhaust gas flows along the exhaust gas flow path through the cells such that more active surface area is available for reaction in each upstream zone than an adjacent downstream zone.

19 Claims, 6 Drawing Sheets

(56) References Cited

U.S. PATENT DOCUMENTS

| | | | |
|---|---|---|---|
| 6,365,283 B1* | 4/2002 | Bruck | F01N 13/0097 502/527.22 |
| 6,475,453 B1* | 11/2002 | Mathes | B01D 53/9431 423/239.1 |
| 7,305,820 B2* | 12/2007 | Miyashita | F01N 13/009 60/285 |
| 7,412,873 B2 | 8/2008 | Althöfer et al. | |
| 7,673,445 B2* | 3/2010 | Goralski, Jr. | F01N 3/0842 60/297 |
| 7,858,052 B2* | 12/2010 | Ament | F01N 13/0097 422/180 |
| 8,273,315 B2 | 9/2012 | Kim et al. | |
| 10,287,952 B2 | 5/2019 | Powell | |
| 10,287,958 B2 | 5/2019 | Szczepanski | |
| 10,598,068 B2 | 3/2020 | Masoudi | |
| 2004/0001782 A1* | 1/2004 | Kumar | B01J 35/04 422/177 |
| 2006/0257297 A1 | 11/2006 | Bruck et al. | |
| 2008/0102010 A1 | 5/2008 | Bruck et al. | |
| 2010/0139261 A1* | 6/2010 | Seo | B01J 35/023 60/311 |
| 2018/0023444 A1* | 1/2018 | Saito | B01D 53/86 60/299 |
| 2019/0145298 A1 | 5/2019 | Abu Al-Rub et al. | |
| 2020/0222838 A1 | 7/2020 | Kelly et al. | |

* cited by examiner

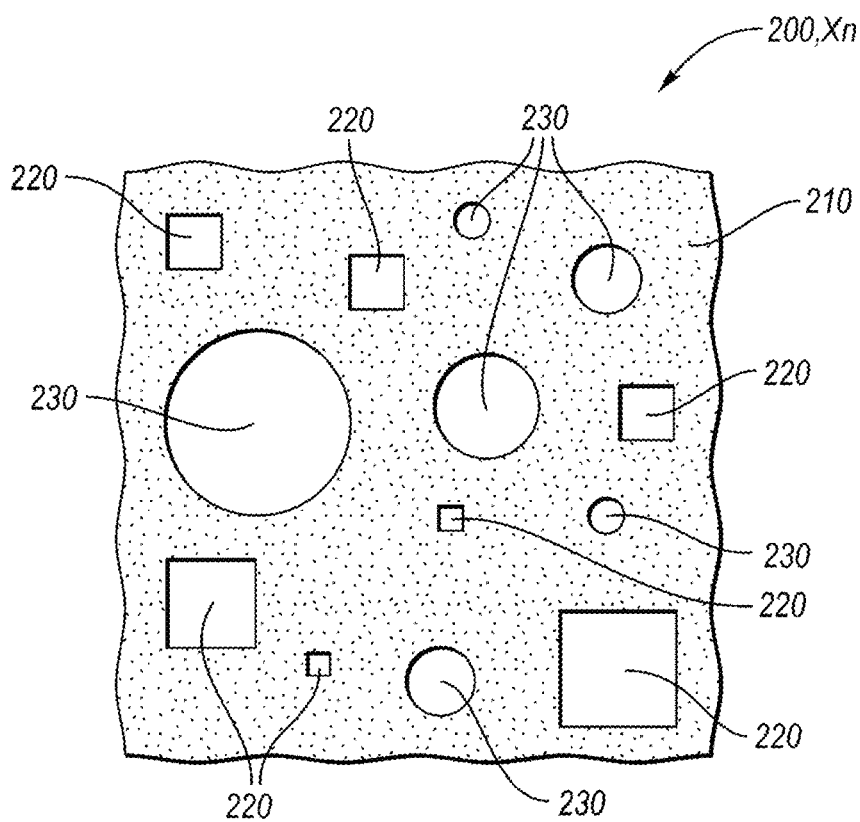
FIG. 2
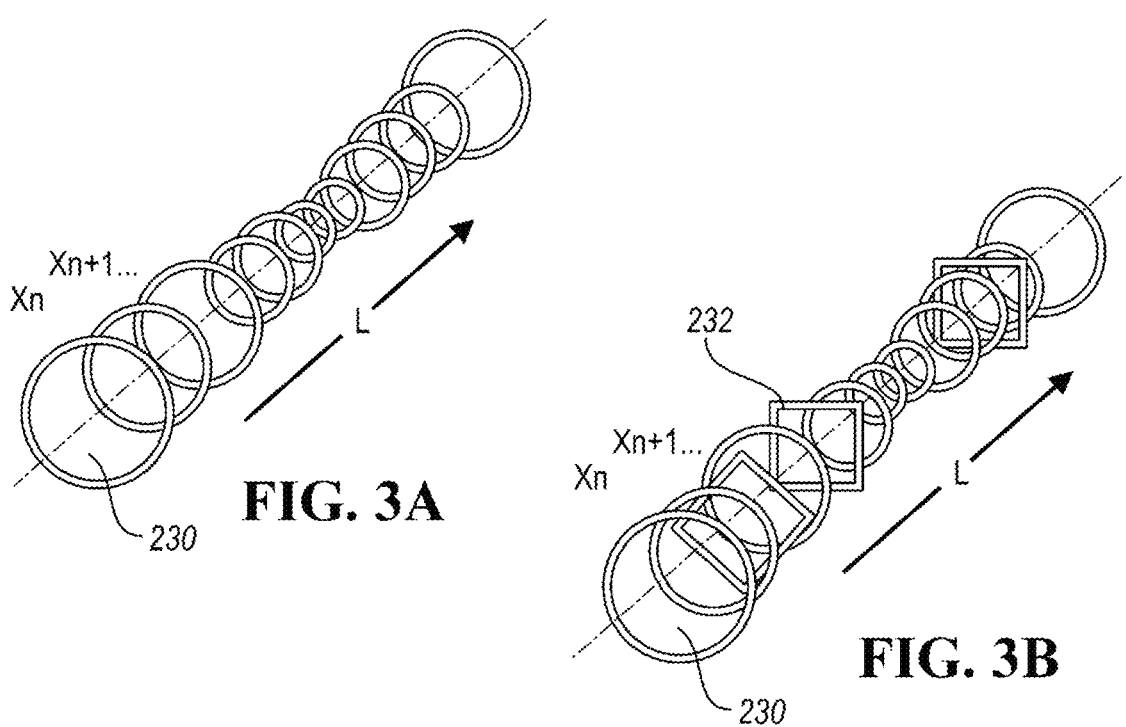
FIG. 3A
FIG. 3B

US 11,643,959 B2

ADDITIVELY MANUFACTURED CATALYTIC CONVERTER SUBSTRATES

TECHNICAL FIELD

The present application is directed to catalytic converters, and more particularly, catalytic converters having additively manufactured three-dimensional structures.

BACKGROUND

Catalytic converters for vehicles typically include ceramic structured formed by extrusion processes or metal structures formed from corrugated metal foils. The geometry of the structures for the catalytic converters are currently limited to those that can be created using extrusion forming, e.g. grid structures, honeycomb structures. After these ceramic or metal structures are formed, they are then coated in precious metals, via a slurry-coat process. These coated structures become the cellular pathways in which exhaust gases travel. The nature of the extrusion forming process may limit the design geometry of the ceramic core cellular pathways, and thus result in a limited amount of surface area available for gas to react with the precious metals loaded on the structures. Furthermore, the rate of precious metal consumption across the length of the catalytic converter's length may be uneven, with precious metals located near the inlet of the converter being consumed more quickly than towards the outlet of the converter.

SUMMARY

According to at least one embodiment, a catalytic converter includes a catalyst substrate including a body having a length and defining a plurality of zones along the length, with each zone having at least one cross-sectional structure defining a plurality of cells forming an exhaust gas flow path through the length via cells of adjacent zones, and the cells being more densely arranged within the at least one cross-sectional structure of an upstream zone than an adjacent downstream zone. The catalytic converter also includes a wash-coat layer deposited on surfaces of the cells forming active surface area configured to react with exhaust gas traveling along the length. The exhaust gas flows along the exhaust gas flow path through the cells such that more active surface area is available for reaction in each upstream zone than an adjacent downstream zone.

According to one or more embodiments, each zone may be comprised of a plurality of cross-sectional structures defining interconnected cells forming the exhaust gas flow path, with interconnected cells each having a first cross-sectional shape in a first cross-sectional structure, and a second cross-sectional shape different from the first in a second cross-sectional structure adjacent to the first cross-sectional structure. In at least one embodiment, each cross-sectional structure may include cells having at least two different cross-sectional shapes, varying average sizes, or both. In certain embodiments, each zone may have 10% to 50% more active surface area than an adjacent downstream zone. In one or more embodiments, each cross-sectional structure may include selectively located cells based on a flow pattern of the exhaust gas at the cross-sectional structure along the length. In at least one embodiment, each cell may include a corresponding microstructure substrate within the cells forming the surface for the wash-coat, each microstructure having a geometric biomimetic design, a non-geometric biomimetic design, or a geometric non-biomimetic design. In further embodiments, at least one cell may include a first microstructure substrate within the cell, and another cell includes a second microstructure within the cell, different from the first microstructure. Moreover, in certain embodiments, each corresponding microstructure substrate may include pores having an average pore size of 150 to 200 µm. In one or more embodiments, each zone may be comprised of a plurality of cross-sectional structures, with a first cross-sectional structure having a first cross-sectional shape, and a second cross-sectional structure having a second cross-sectional shape different from the first cross-sectional shape.

According to at least one embodiment, a catalytic converter includes a catalyst substrate including a macrostructure body having an upstream side and a downstream side defined along a length of the body, with the macrostructure body having a plurality of zones along the length with each zone including at least one cross-sectional mesostructure defining cells that form channels along the length of the substrate, and each of the cross-sectional mesostructures has a property different from a neighboring cross-sectional mesostructure and specific to the cross-sectional mesostructure, the property being based on a cross-sectional location along the length. The catalytic converter further includes a wash-coat layer disposed on surfaces of the cells within each cross-sectional mesostructure to react with exhaust gas traveling along the length of the body. The property of each mesostructure is a cross-sectional shape, a cell shape, a cell wall thickness, a cell density, cell positions, active surface area, or combinations thereof.

According to one or more embodiments, the catalytic converter may further include an exhaust introduction member positioned forward of the upstream side, the exhaust introduction member defining exhaust channels therein to evenly distribute exhaust flow in a radial direction to a first zone of the catalyst substrate. In at least one embodiment, each cross-sectional mesostructure may include a corresponding microstructure within the cells forming the surfaces for the wash-coat, each microstructure having a geometric biomimetic design, a non-geometric biomimetic design, or a geometric non-biomimetic design. In at least one further embodiment, at least one cell may include a first microstructure within the cell, and another cell includes a second microstructure within the cell, different from the first microstructure. In certain embodiments, each corresponding microstructure includes pores having an average pore size of 150 to 200 µm. In certain other embodiments, the microstructure may be a burner material which, responsive to a cold start request, preheats the mesostructure of the catalyst substrate. In one or more embodiments, each cross-sectional structure may include cells having at least two different cross-sectional shapes, varying average sizes, or both. In at least one embodiment, an upstream zone may have at least 10% more active surface area than an adjacent downstream zone.

According to at least one embodiment, a catalytic converter includes a catalyst substrate including a body having a length and defining a plurality of zones along the length, with each zone having at least one cross-sectional structure defining a plurality of cells forming an exhaust gas flow path through the length via cells of adjacent zones, and the cells being more densely arranged within the at least one cross-sectional structure of an upstream zone than an adjacent downstream zone and including a microstructure therein. The catalytic converter further includes a wash-coat layer deposited in the microstructure forming active surface area configured to react with exhaust gas traveling along the length. The exhaust gas flows along the exhaust gas flow path through the cells such that more active surface area is available for reaction in each upstream zone than an adjacent downstream zone.

According to one or more embodiments, the at least one cross-sectional structure and the microstructure may be a biomimetic design. In certain embodiments, the microstructure may be a burner material which, responsive to a cold start request, may preheat the body of the catalyst substrate.

BRIEF DESCRIPTION OF THE DRAWINGS

FIG. 2 is a schematic illustration of a cross-section of a catalyst substrate, according to an embodiment;

FIGS. 3A-B are schematic illustration of exhaust gas paths through the catalyst substrate of FIG. 2, according to various embodiments;

DETAILED DESCRIPTION

Figure 1:
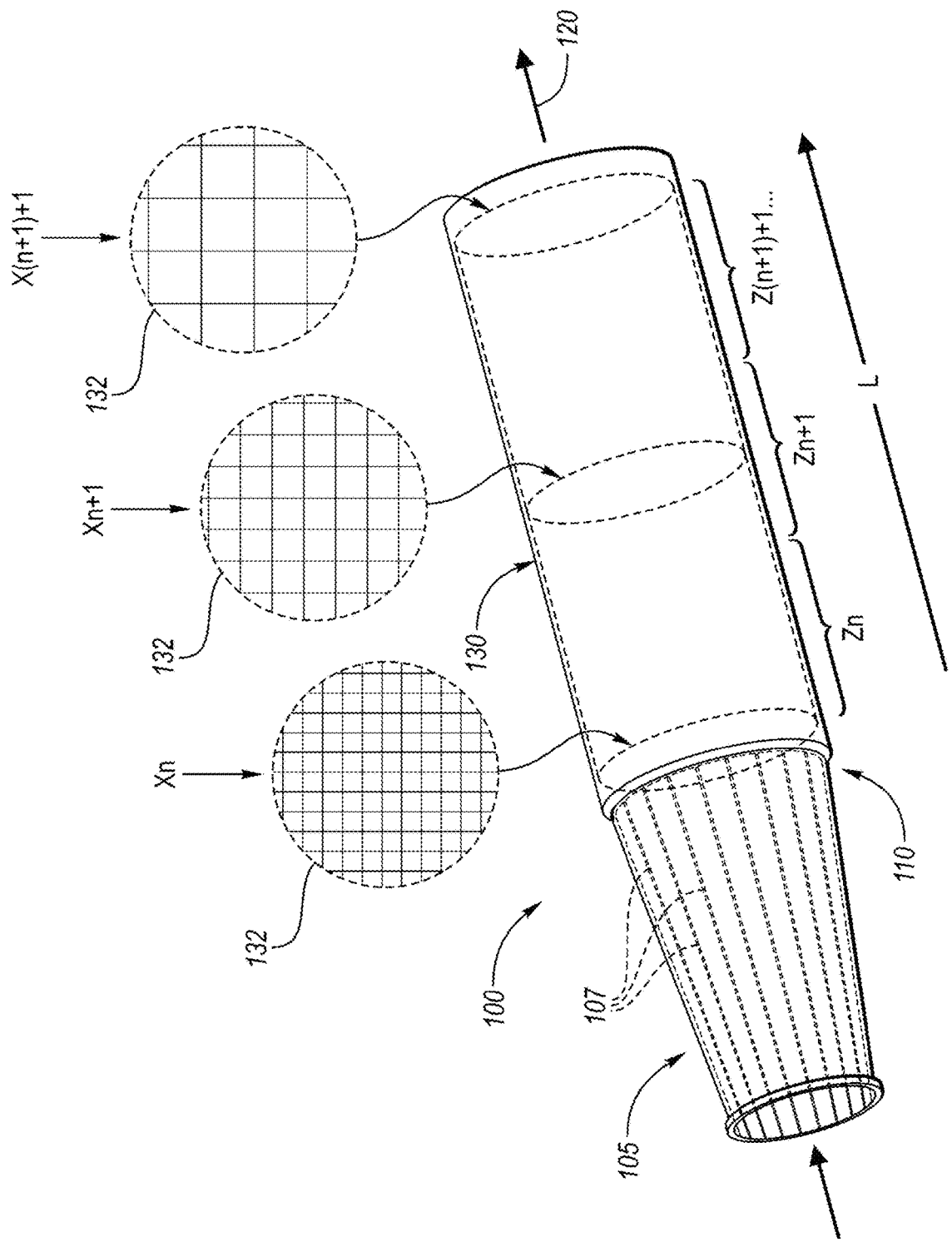
FIG. 1 is a schematic illustration of a catalytic converter, according to an embodiment.
Figure 4A:
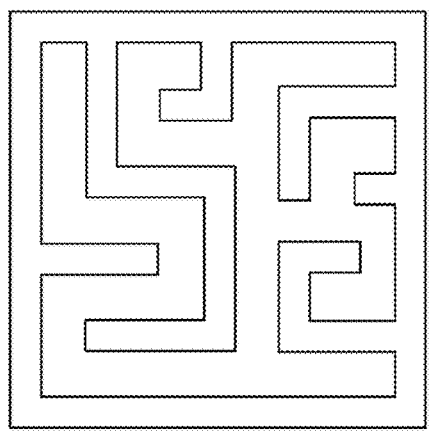
FIGS. 4A-D are schematic illustrations of microstructures for catalyst substrate cells, according to various embodiments.
Figure 4B:
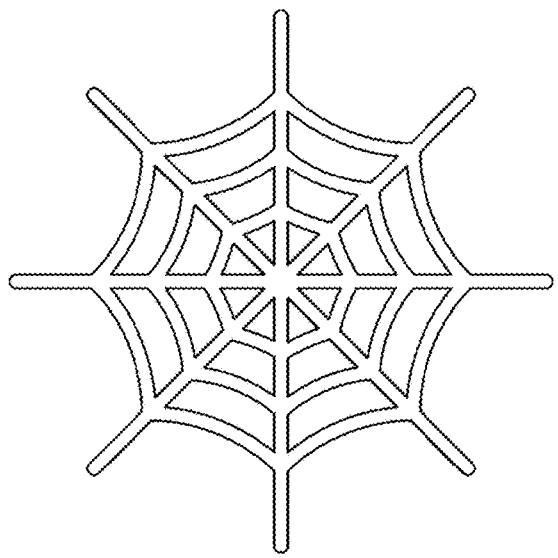
Figure 4C:
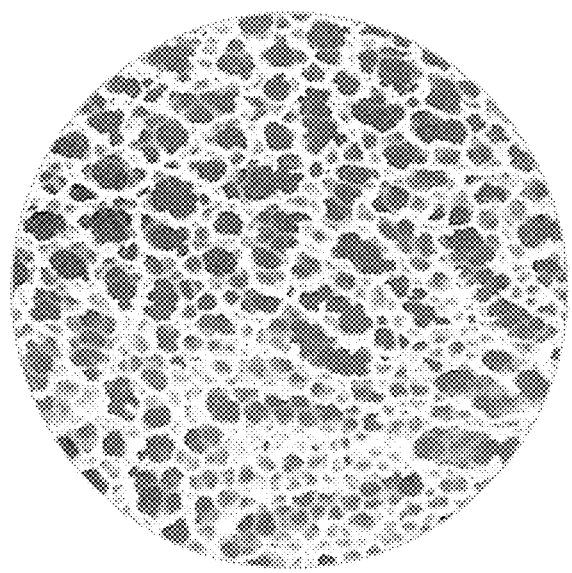
Figure 4D:
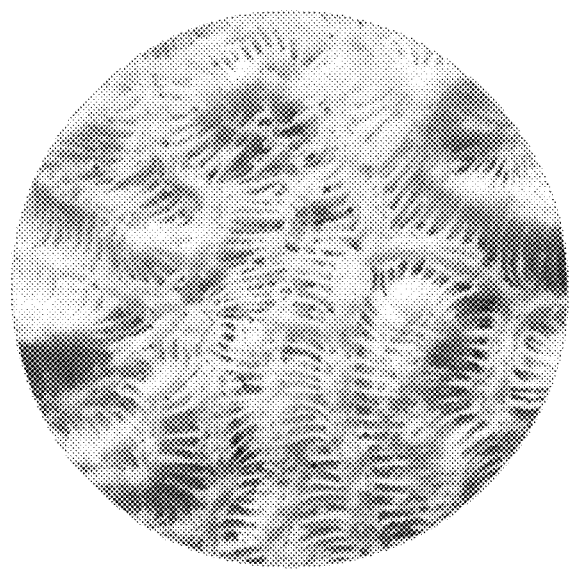

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about". The term "substantially," "generally," or "about" may be used herein and may modify a value or relative characteristic disclosed or claimed. In such instances, "substantially," "generally," or "about" may signify that the value or relative characteristic it modifies is within ±0%, 0.1%, 0.5%, 1%, 2%, 3%, 4%, 5% or 10% of the value or relative characteristic (e.g., with respect to degrees of offset from an angle when referring to substantially perpendicular or parallel). Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

Catalytic converters are used in vehicles to convert gases produced from internal combustion engines. Conventionally, catalytic converters made from extruded ceramics or metal foils that are dipped in a slurry containing metal catalytic components. The catalytic converter provides surface area for gases to contact for the conversion over the length of the converter and across the cross-section of the converter. These conventional manufacturing processes to make ceramic and metal catalytic converters limits the geometries possible in any given cross-section and over the length of the converter, thus limiting the available active surface area for gas conversion.

According to one or more embodiments, an alternative to conventionally designed and manufactured catalytic converters (i.e., monoliths/cores/substrates) is provided. A catalytic converter according to at least one embodiment includes a unique mesostructure of cells and microstructure within the cells for gas conversion, each of which may vary along the axial length from the inlet end to the outlet end of the catalytic converter. The microstructures for the catalytic converter may mimic microstructures found in the natural world, such as, but not limited to, mammalian lung alveoli microstructures, deciduous flora leaf microstructures, fish/amphibian gill microstructures, and coral bone macrostructures, e.g., brain coral (diploria labyrinthiformis). The catalytic converter structures are formed using an additive manufacturing process to realize benefits such as using multiple materials to form intricate and tailored structures to the exhaust gas flow profile, pressure, and required active surface area, and utilizing the precious metal wash-coat more efficiently to result in overall package size reduction and shape optimization. Any suitable method of additive manufacturing is contemplated for forming the catalytic converters described herein, including methods where ceramic nanoparticles (and where two materials are forming the mesostructure and the microstructures, metal nanoparticles) are suspended in an ink, which is jetted from an array of nozzles to print the substrate layer by layer, with the ink being removed via heat energy and/or chemical energy (for example, sintering) to bond the nanoparticles together. As such, catalytic converters with high surface area, tortuous pathways, with tailored mesostructure and microstructure designs to improve gas exchange efficiency are provided.

Referring to FIG. 1, a schematic illustration of a catalytic converter 100 is shown according to an embodiment. The catalytic converter 100 includes an inlet 110 and an outlet 120, with a catalyst substrate body 130 therebetween. The body 130 includes a plurality of zones $Z_n$ corresponding to exhaust gas flow regions defined along an axial length L of the catalytic converter 100 from the inlet 110 to the outlet 120, with an upstream side and a downstream side relating to the inlet 110 and the outlet 120, respectively. The inlet 110, the outlet 120, and the body 130 are each formed of a substrate material capable of withstanding the temperature and pressure requirements of the catalytic converter 100, and define a plurality of flow paths for the exhaust gas to flow through the catalytic converter 100. In certain embodiments, the substrate may be formed of a ceramic (e.g., zirconia or alumina), metal, alloys (e.g., Fe—Cr—Al powder), or combinations thereof. In certain embodiments, each of the inlet 110, the outlet 120, and the body 130 may be formed of a different substrate material, or a combination of substrate materials. For example, via additive manufacturing, the substrate material of the body (i.e., the macrostructure or the mesostructure) may vary from zone to zone. The substrate material forming the body 130 may further be coated by a wash-coat forming the active surface area for reaction with the exhaust gas. Any suitable wash-coat material may be used for reaction with the exhaust gas. The thickness of the wash-coat layer on the substrate may be, in some embodiments 10 to 50 μm, in other embodiments, 15 to 45 μm, and in yet other embodiments, 20 to 40 μm. In certain embodiments, the wash-coat thickness may be uniform through the axial and radial lengths of the converter 100. In other embodiments, the wash-coat thickness may vary in the radial direction or axial direction as based on the exhaust gas flow profile through the particular zone and/or cross-section.

Each of the body 130, the inlet 110, and the outlet 120 may have at least one selectively designed cross-section $X_n$ in each zone, forming a mesostructure such that the substrate has for example, varied geometries, shapes, etc., providing tailored contact surface for the exhaust gas based on the particular region, flow rate, temperature, and pressure of the region along the axial length L of the converter 100. Furthermore, in certain embodiments, the inlet 110 may be connected to an exhaust gas inlet member 105 defining printed channels 107 for distributing the exhaust gas flow volume more evenly to the body 130 in the radial direction (i.e., altering the flow profile of the exhaust gas entering the body 130). In each zone $Z_n$, the substrate of the body 130 has one or more cross-sectional structures $X_n$ design forming the mesostructure of cells, with each cell further optionally including a microstructure therein. The microstructure may be a metal material (e.g., stainless steel). Each zone $Z_n$ may have a plurality of different cross-sectional structure designs with different mesostructures defining cells of varying shape, size, and radial position along the axial length of the zone, or may have uniformly shaped cells in the mesostructure with the cells having varying dimensions from cross-section to cross-section (or zone to zone) or radial position from cross-section to cross-section (or zone to zone). Similarly, the microstructure may vary within the cells from cross-section to cross-section or zone to zone. In certain embodiments, the mesostructure and/or the microstructure of a cross-section within zone $Z_1$ is different a mesostructure and/or microstructure from $Z_2$, which may be different from $Z_3$, and so on, to change the active surface area for the exhaust gas flow through the body 130. The catalyst substrate mesostructure and microstructure may be simultaneously additively manufactured from similar or different materials such that the tailored mesostructure can be formed along with the requisite microstructure for improving the performance of the catalytic converter.

The size, position, and active surface area provided by the cross-sectional shape of the cells 132 within each cross-section $X_n$ at each zone $Z_n$ allows for exhaust gas to be more efficiently consumed along the exhaust gas flow path of the catalytic converter. For example, in FIG. 1, each cell 132 of the body 130 has a square shape, however the size of the cell 132 varies from zone to zone (e.g., getting larger moving downstream from $Z_1$ to $Z_2$ to $Z_3$). Although shown as squares in FIG. 1, any suitable cell shape or combination of cell shapes, as well as combinations of microstructure within the cells, is contemplated by the present application, as can be formed via additive manufacturing, and will be described in the examples of FIGS. 2-7. Furthermore, each zone $Z_n$ may include a plurality of cross-sectional structure designs within the zone $Z_n$. As opposed to conventional catalytic converters having honeycomb mesostructures throughout the axial length of the converter, in at least one embodiment of the present application, the mesostructure of the catalytic converter may define tortuous pathways along the axial length of the converter (i.e., the exhaust gas flow path in from zone $Z_n$ to zone $Z_{n+1}$ or from cross-section to cross-section within a zone $Z_n$ is at a different radial position with respect to a center axis (which may be formed along the axial length axis in the example of a cylindrical catalytic converter)). The mesostructure generally has pores having cells with an average size (e.g., the largest dimension) of 150 to 5000 µm. Additive manufacturing allows for forming unique mesostructured and microstructured designs for the catalytic converter to allow for selective active surface area amounts at the various locations along the flow path, for example, based on volume flow rates along the exhaust gas flow path, and may optimize pressure drops along the flow path.

As such, the cell size, radial position, and shape can be varied to form the various mesostructure cross-sections of the catalyst substrate body 130, thus forming the efficient exhaust gas flow path. In certain embodiments, the cells may have an average cell size (e.g., largest dimension) of 150 to 5000 µm. Via additive manufacturing, the cells per square inch (CPSI) is varied across the zones Z over the axial length of the converter 100. In certain embodiments, the CPSI decreases over the axial length of the converter 100 (i.e., the cells become larger). Additionally, the CPSI in each zone Z can be optimized in various manners, for example, by varying the thickness of cell walls in the axial direction, varying the thickness of the cell walls in the radial direction, varying cell internal geometry in the axial direction to pack more cells into the available volume in the body 130, varying cell internal geometry in the radial direction to fit more cells in a zone Z, including varying biomimetic geometric or non-geometric microstructures within the cells, etc. By forming the body 130 via additive manufacturing, the specific surface area available for reaction with the exhaust gas can be tailored based on consumption and flow rates within the particular region of the catalytic converter 100.

By selectively designing the substrate across the axial length of the converter 100, the available active surface area for exhaust gas reaction can be varied over the axial length of the converter 100, thus resulting in optimized emission performance. In one or more embodiments, the active surface area in a zone $Z_n$ may be 10 to 50% more than the adjacent zone $Z_{n+1}$, in other embodiments, 15 to 45%, and in yet other embodiments, 20 to 40% higher. For example, as shown in FIG. 1, high pressure/temperature zone $Z_1$ may have a 30% higher active surface area (e.g., 1000 CPSI) than middle zone $Z_2$ (e.g., 500 CPSI), which has a 30% higher active surface area than the low pressure/low temperature zone $Z_3$ (e.g., 100 CPSI). In other embodiments, the high pressure/temperature zone $Z_1$ may have lower active surface area than an adjacent downstream zone, thus having an increasing active surface area down the length of the converter.

Furthermore, via additive manufacturing, the macro-geometry (i.e., in the scale of 1-1000 mm) of the converter 100 can be varied based on the flow velocity profile of the exhaust gas through the converter and package space in a vehicle. In the example shown in FIG. 1, the body 130 is shown as a cylindrical body, however other geometric shapes and biomimetic geometries, such as, but not limited to cone-shaped, hour glass, football, square pyramid, cuboid, tetrahedron, hexagonal pyramidic, peanut, amorphous, bean, etc., are also contemplated to optimize the converter based on available package space. For example, the cross-sectional geometry can vary along the centerline axis or be constant as formed by additive manufacturing methods. As such, the macro-geometry of each cross-section may be selectively shaped based on the exhaust gas flow profile at the location along the axial length of the catalytic converter 100.

Hereinafter, with reference to FIGS. 2-6C, examples of variations in the cross-section design of the mesostructure and microstructure of the cells of the catalytic converter 100 are shown. Although particular arrangements are described herein, other cell arrangements, shapes, shape combinations, cell distributions, material combinations, etc., and combinations thereof, are also contemplated, and depiction of particular arrangements and discussion of particular combinations is not intended to be limiting.

Referring to FIG. 2, an example of a cross section view of a catalytic converter 200 is shown. The catalytic converter 200 includes a substrate 210 forming the structure of the converter 200, and defining cells therein. The substrate 210 is coated with a wash-coat (not shown) for reacting with exhaust gases within the cells. As shown in the example of FIG. 2, the cells include various shapes, such as, for example, square cells 220 and circular cells 230. Although only two different shapes are shown, any number of shapes (e.g., two or more) shapes is also contemplated. Each of the cells, e.g., square cells 220 and each of the circular cells 230, have varying sizes, for example, varying diameters, height, width, etc., resulting in varying cell area between each of the square cells 220 and the circular cells 230. Thus, each cell has a unique cross-section with varying dimensions, and are positioned in an optimized radial position (with respect to a center of the cross-section of the substrate 210), in a non-grid like pattern when compared with conventional rectilinear designs.

Referring to FIG. 3A, a cell 230 of the substrate 210 of FIG. 2 is shown along the axial length L of the catalytic converter 200. From cross-section $X_n$ to cross-section $X_{n+1}$ along the axial length, the outer perimeter of the cell may be the same shape as cell 230 or a different shape 232 as per the desired surface area at the particular cross-section (as shown in FIG. 3B). Furthermore, the size (i.e., dimensional area) of the cell may vary from cross-section to cross-section, such that certain cross-sections have a larger cell opening and others may have smaller cell areas. Additionally, although shown generally centered along the axial length, the cell position may vary from cross-section to cross-section, thus forming tortuous paths for the exhaust gas. By varying the internal mesostructure of the catalyst substrate such that it is not a repeating, constant geometric pattern, emission performance can be optimized by adjusting the active surface area to compensate for changes in reaction rate, thereby enabling homogeneous depletion and full use of the expensive, precious metal dip coating of the wash-coat layer. These properties varying from section to section may be selected based on optimizing exhaust gas flow profiles, pressure (i.e., minimizing pressure drops), or active surface area requirements for the emission performance of the catalytic converter 200, thereby providing improvements in both fuel efficiency and gas conversion efficiency. Furthermore, optimized surface area and efficiency translates to less required package space, lower weight, and a smaller amount of precious metals required.

Although not shown in FIG. 2, the cells 230 of the substrate 210 may include a microstructure therein. The microstructure may be of a similar ceramic material to the material of the substrate 210, or may be an additively manufactured metallic microstructure. When additively manufacturing microstructures, surface artifacts may be inherent on the microstructure due to additive manufacturing or be intentionally included thereon which can increase the overall surface area instead of being viewed as a design issue. Referring to FIGS. 4A-D, examples of microstructure designs for within the cells 220, 230 of FIG. 2 are provided. In certain embodiments, the microstructure may be a geometric or non-geometric pattern, and may be a biomimetic or non-biomimetic pattern (i.e., the microstructure may be geometric and non-biomimetic as in FIG. 4A (e.g., rectangular mazes, Schwarz minimal surfaces and/or other triply periodic minimal surface lattices, such as the gyroid and lidinoid), geometric and biomimetic as in FIG. 4B (e.g., spider web, butterfly wing scales,), or non-geometric and biomimetic as in FIG. 4C (e.g., brain coral, lung alveoli, human cancellous bone trabeculae, and termite mound tunnels, etc.). Biomimetic patterns are those mimicking patterns that occur naturally in biology or chemistry. Biomimetic and geometric patterns create high surface area designs for receiving the wash-coat, and thus for gas exchange, and also form torturous pathways for the exhaust gases to navigate, which improves gas exchange efficiency.

Figure 5A:
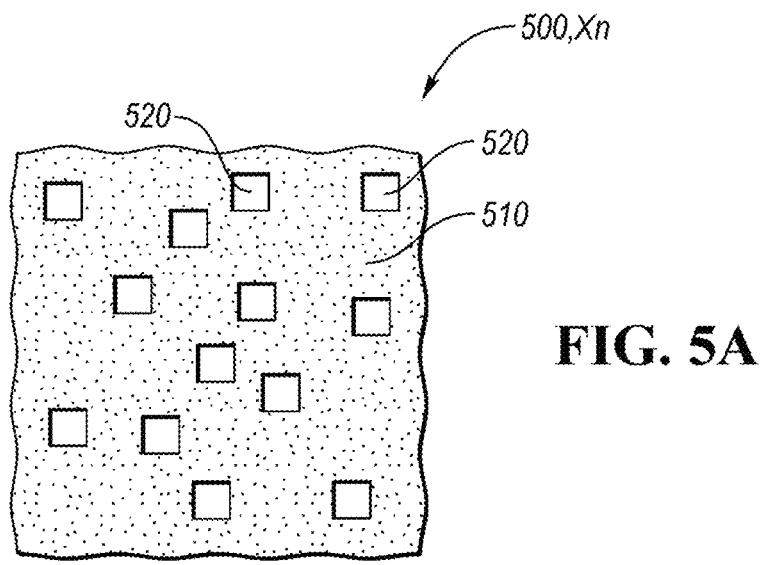
FIGS. 5A-C are schematic illustrations of catalyst substrate cross-sections, according to various embodiments.
Figure 5B:
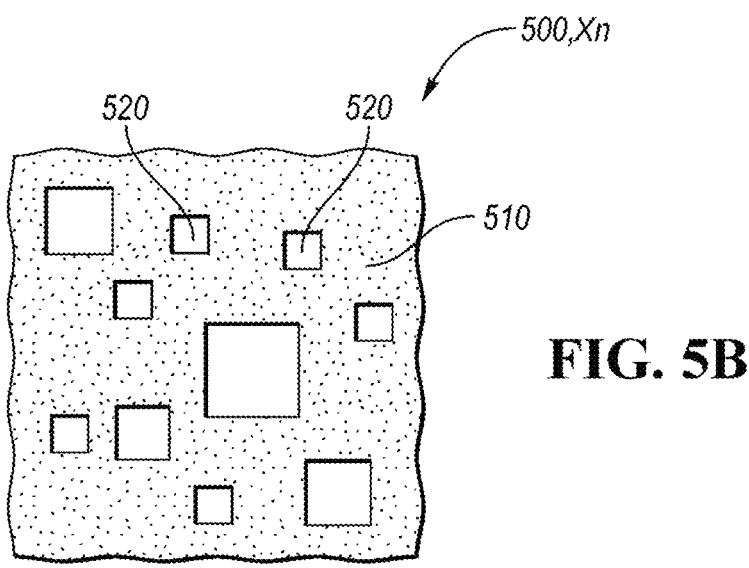
Figure 5C:
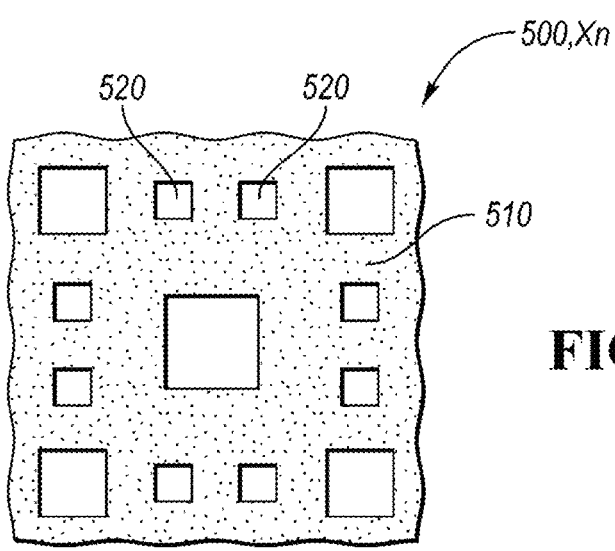

Referring to FIGS. 5A-C, various cross-sectional mesostructure designs 500 are shown for catalyst substrate bodies 510 according to various embodiments. As previously discussed, these cross-sections $X_n$ may be used with other cross-sections and/or microstructures to form exhaust gas flow paths along the axial length of the catalytic converter, and each particular cross-section is not intended to limit the adjacent cross-sectional design. In FIGS. 5A-C, each cell 520 of the substrate 500 has a similar cross-sectional shape (i.e., a square shape). However, the cells 520 of FIG. 5A include cells with constant perimeters and/or cell area in the cross-section, with the cells 520 being positioned in specific locations (not grid-like). Whereas, in FIG. 5B, although the cells 520 include cells of similar cross-sectional shape (i.e., square shape), the perimeters and/or cell area varies from cell to cell, and the cells are positioned at specific locations (not grid-like). Furthermore, in FIG. 5C, the cells 520 are of similar cross-sectional shape (i.e., square shape), and include varying perimeters/cell area, however the cells are disposed about the cross-section in a grid like pattern and design. Each of the cross-sections shown in FIGS. 5A-C may be appropriate based on a particular position along the axial length of the catalytic converter, and adjacent a selected cross-section pattern, as based on the particular pressure, active surface area, and exhaust gas flow profile desired.

Figure 6A:
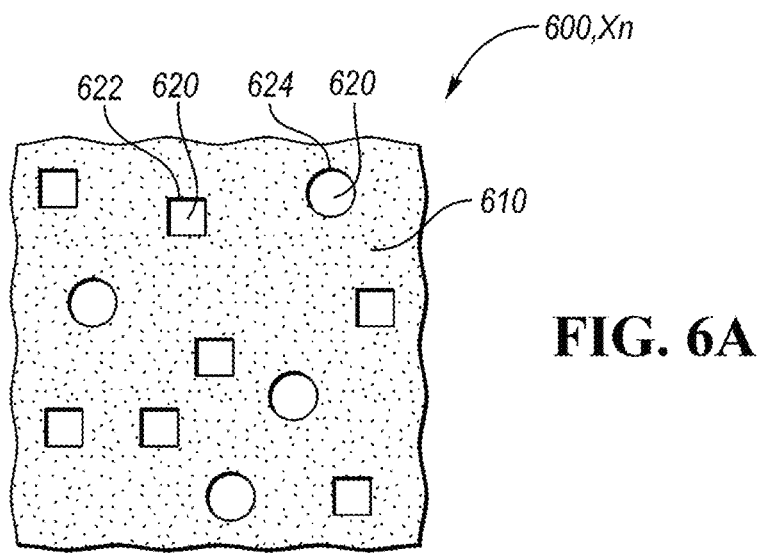
FIGS. 6A-C schematic illustrations of catalyst substrate cross-sections, according to various embodiments.
Figure 6B:
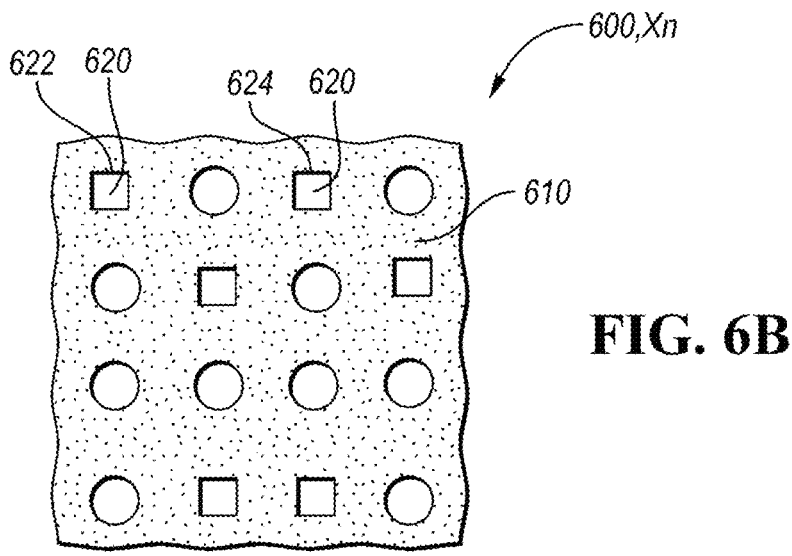
Figure 6C:
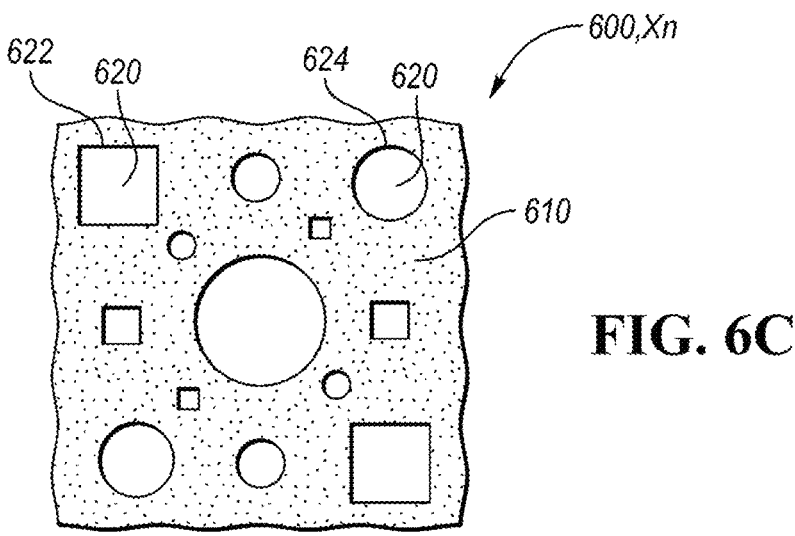

Referring to FIGS. 6A-C, various cross-sectional mesostructure designs 600 are shown for catalyst substrate bodies 610 according to various embodiments. As previously discussed, these cross-sections may be used with other cross-sections and/or microstructures to form exhaust gas flow paths along the axial length of the catalytic converter, and each particular cross-section is not intended to limit the adjacent cross-sectional design. In FIGS. 6A-C, each cell 620 of the substrate 600 has a plurality of cross-sectional shapes (e.g., two or more shapes such as, for example, a square shape 622 and circular shape 624). However, the cells 622, 624 of FIG. 6A include cells with constant perimeters and/or cell area in the cross-section, even though the cells have different shapes, with the cells 622, 624 being positioned in specific locations (not grid-like). Whereas, in FIG. 6B, although the cells 622, 624 still include cells of varying cross-sectional shape (e.g., square and circular shape), the perimeters and/or cell area varies from cell to cell, and the cells are positioned at specific locations in a grid-like pattern. Furthermore, in FIG. 6C, the cells 622, 624 are of varying cross-sectional shape (e.g., square and circular shape), and include varying perimeters/cell area, however the cells are disposed about the cross-section in an ordered (i.e., non-grid like) pattern and design with the particular cell location being specifically selected in the cross-section. Each of the cross-sections shown in FIGS. 6A-C may be appropriate based on a particular position along the axial length of the catalytic converter, and adjacent a selected cross-section pattern, as based on the particular pressure, active surface area, and exhaust gas flow profile desired.

Figure 7:
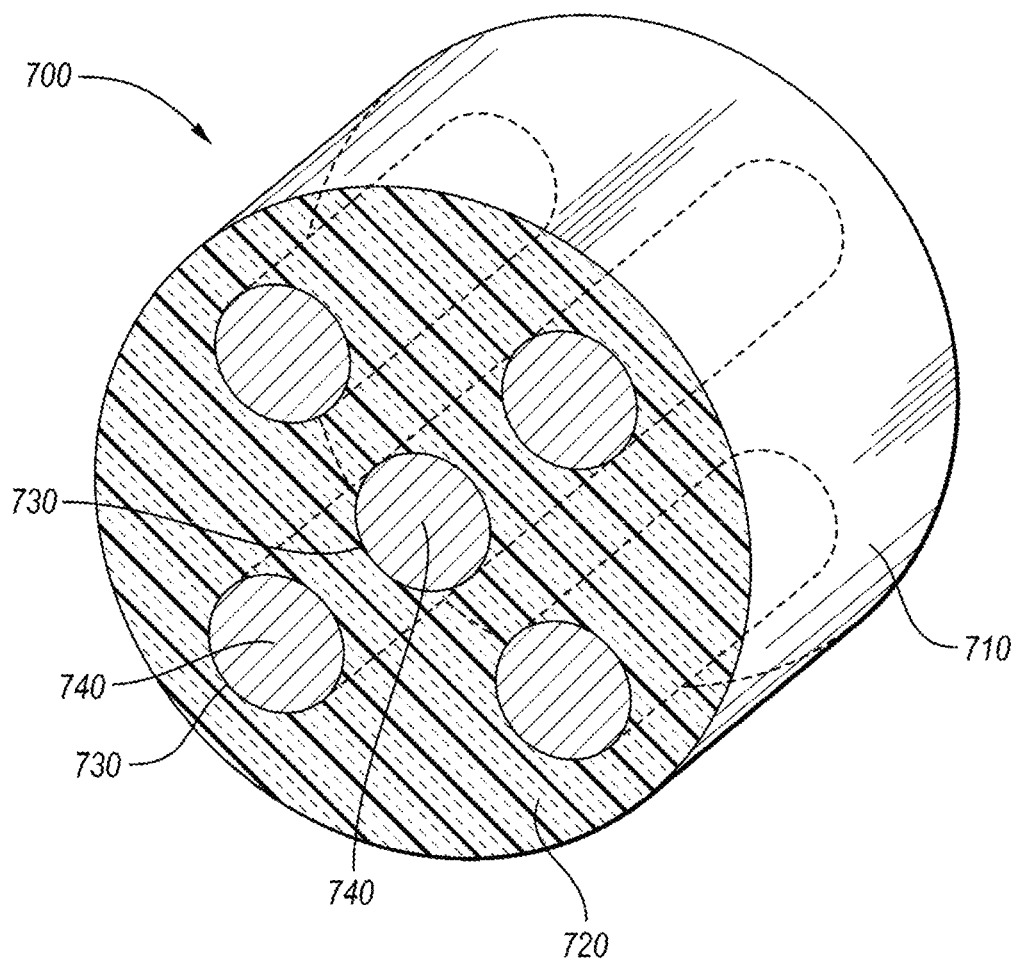
FIG. 7 is a schematic illustration of a catalytic converter, according to yet another embodiment.

Additive manufacturing and multi-material catalytic converters with tailored macro-, meso-, and microstructures have additional usage that will be discussed herein. FIG. 7 shows a catalytic converter 700 with a catalyst substrate body 710 having mesostructure 720 having a microstructure of cells therein. The mesostructure is formed of a ceramic material which is additively manufactured to form the microstructure within the mesostructure 720. The mesostructure 720 and the microstructure therein form the exhaust gas flow path along the length of the catalyst substrate 710 and include a wash-coat disposed thereon (not shown) for reacting with the exhaust gas. The mesostructure 720 may also define openings 730 including a burner material 740 disposed therein. The burner material 740 is within the openings 730 which is used for preheating the catalyst substrate 710 responsive to a vehicle cold start to reduce vehicle cold start emissions. The burner material 740 may be any suitable material that has good thermal and/or electrical properties. For example, the burner material may be, but is not limited to, an additively manufactured copper alloy (e.g., CuCr1Zr) an additively manufactured aluminum alloy (e.g., $AlSi_{10}Mg$), or combinations thereof. The burner material 740 may be formed of an additively manufactured metal that is heated during the cold start to conduct heat through the mesostructure 720 of the catalyst substrate 710. Because the mesostructure 720, the microstructure, and/or the burner material 740 are formed via additive manufacturing, they may be simultaneously formed. The vehicle cold start may be triggered by various events, such as, but not limited to, standard vehicle ignition (i.e. key-on, remote-start), a proximity sensor indicating that the customer is approaching, and/or via a customer requests that the vehicle prepare for their arrival.

In addition to providing microstructures of a different material (e.g., metal) from the ceramic substrate body, the catalytic converter in certain embodiments may be additively manufactured to harness heat from the chemical reaction process and re-purpose it. For example, the ceramic core could be housed by a metal lattice structure that is designed to minimize heat transfer from the core to the surrounding environment. Conventionally designed catalytic converter systems rely on separate components to shield nearby sub-systems from the heat generated by the gaseous chemical reactions. As such, a multi-material catalytic converter can utilize an additively manufactured catalytic substrate body and an exterior structure to harness and dissipate heat from the catalyst substrate.

According to one or more embodiments, varying cross-sectional designs for the macrostructure, mesostructure, and microstructure of a catalytic converter is provided. The catalyst substrate of the catalytic converter is formed of an additively manufactured ceramic material such that the cross-section of the substrate body and the mesostructure forming cells within the substrate can vary in design from zone to zone, or within each zone, as based on performance requirements and active surface area optimization for the catalytic converter. Furthermore, via additive manufacturing, the cells of the mesostructure may include a microstructure of a different material disposed therein, providing additional surface area for exhaust gas reaction. The materials may be simultaneously formed by additive manufacturing and tailored to specific axial locations along the length of the catalytic converter such that upstream sections may have more active surface area (by for example dense cell packing) than an adjacent downstream zone. The properties (e.g., cell shape, cell position, cell size, etc.) may vary from cross-section to cross-section and zone to zone to optimize performance. In certain embodiments, the microstructure may be a biomimetic structure. As such, tortuous exhaust gas pathways or high active surface area pathways can be formed to optimize wash-coat depletion along the length of the catalytic converter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A catalytic converter comprising:
   a catalyst substrate including a body having a length and defining a plurality of zones along the length, each zone having at least one cross-sectional structure defining a plurality of cells forming an exhaust gas flow path through the length via cells of adjacent zones, the cells being more densely arranged within the at least one cross-sectional structure of an upstream zone than an adjacent downstream zone; and
   a wash-coat layer deposited on surfaces of the cells forming active surface area configured to react with exhaust gas traveling along the length,
   wherein the exhaust gas flows along the exhaust gas flow path through the cells such that more active surface area is available for reaction in each upstream zone than an adjacent downstream zone, and each cell includes a corresponding microstructure substrate within the cells, the microstructure substrate forming the surfaces for the wash-coat, with each microstructure having a geometric biomimetic design, a non-geometric biomimetic design, or a geometric non-biomimetic design.

2. The catalytic converter of claim 1, wherein each zone is comprised of a plurality of cross-sectional structures defining interconnected cells forming the exhaust gas flow path, with interconnected cells each having a first cross-sectional shape in a first cross-sectional structure, and a second cross-sectional shape different from the first in a second cross-sectional structure adjacent to the first cross-sectional structure.

3. The catalytic converter of claim 1, wherein each cross-sectional structure includes cells having at least two different cross-sectional shapes, varying average sizes, or both.

4. The catalytic converter of claim 1, wherein each zone has 10% to 50% more active surface area than an adjacent downstream zone.

5. The catalytic converter of claim 1, wherein each cross-sectional structure includes selectively located cells based on a flow pattern of the exhaust gas at the cross-sectional structure along the length.

6. The catalytic converter of claim 1, wherein at least one cell includes a first microstructure substrate within the cell, and another cell includes a second microstructure within the cell, different from the first microstructure.

7. The catalytic converter of claim 1, wherein each corresponding microstructure substrate includes pores having an average pore size of 150 to 200 µm.

8. The catalytic converter of claim 1, wherein each zone is comprised of a plurality of cross-sectional structures, with a first cross-sectional structure having a first cross-sectional shape, and a second cross-sectional structure having a second cross-sectional shape different from the first cross-sectional shape.

9. A catalytic converter comprising:
a catalyst substrate including a macrostructure body having an upstream side and a downstream side defined along a length of the body, the macrostructure body having a plurality of zones along the length with each zone including at least one cross-sectional mesostructure defining cells that form channels along the length of the substrate, each of the cross-sectional mesostructures has a property different from a neighboring cross-sectional mesostructure and specific to the cross-sectional mesostructure, the property being based on a cross-sectional location along the length; and
a wash-coat layer disposed on surfaces of the cells within each cross-sectional mesostructure to react with exhaust gas travelling along the length of the body,
wherein the property of each mesostructure is a cross-sectional shape, a cell shape, a cell wall thickness, a cell density, cell positions, active surface area, or combinations thereof.

10. The catalytic converter of claim 9, further comprising an exhaust introduction member positioned forward of the upstream side, the exhaust introduction member defining exhaust channels therein to evenly distribute exhaust flow in a radial direction to a first zone of the catalyst substrate.

11. The catalytic converter of claim 9, wherein each cross-sectional mesostructure includes a corresponding microstructure within the cells forming the surfaces for the wash-coat, each microstructure having a geometric biomimetic design, a non-geometric biomimetic design, or a geometric non-biomimetic design.

12. The catalytic converter of claim 11, wherein at least one cell includes a first microstructure within the cell, and another cell includes a second microstructure within the cell, different from the first microstructure.

13. The catalytic converter of claim 11, wherein each corresponding microstructure includes pores having an average pore size of 150 to 200 μm.

14. The catalytic converter of claim 11, wherein the microstructure is a burner material which, responsive to a cold start request, preheats the mesostructure of the catalyst substrate.

15. The catalytic converter of claim 9, wherein each cross-sectional structure includes cells having at least two different cross-sectional shapes, varying average sizes, or both.

16. The catalytic converter of claim 9, wherein an upstream zone has at least 10% more active surface area than an adjacent downstream zone.

17. A catalytic converter comprising:
a catalyst substrate including a body having a length and defining a plurality of zones along the length, each zone having at least one cross-sectional structure defining a plurality of cells forming an exhaust gas flow path through the length via cells of adjacent zones, the cells being more densely arranged within the at least one cross-sectional structure of an upstream zone than an adjacent downstream zone and including a microstructure therein; and
a wash-coat layer deposited in the microstructure forming active surface area configured to react with exhaust gas traveling along the length,
wherein the exhaust gas flows along the exhaust gas flow path through the cells such that more active surface area is available for reaction in each upstream zone than an adjacent downstream zone.

18. The catalytic converter of claim 17, wherein the at least one cross-sectional structure and the microstructure are a biomimetic design.

19. The catalytic converter of claim 17, wherein the microstructure is a burner material which, responsive to a cold start request, preheats the body of the catalyst substrate.

* * * * *